July 26, 1938.  O. K. KJOLSETH  2,125,184

VEHICLE TRUCK CONSTRUCTION

Filed Jan. 27, 1937

Inventor:
Ole K. Kjolseth,
by Harry E. Dunham
His Attorney.

Patented July 26, 1938

2,125,184

UNITED STATES PATENT OFFICE 2,125,184

VEHICLE TRUCK CONSTRUCTION

Ole K. Kjolseth, Erie, Pa., assignor to General Electric Company, a corporation of New York Application January 27, 1937, Serial No. 122,590

4 Claims. (Cl. 105—224.1)

My invention relates to vehicle truck constructions and more particularly to an improved and simplified suspension system for vehicle trucks.

An object of my invention is to provide an improved and simplified truck construction wherein shocks and jars received by the wheels are effectively dampened by the truck suspension system.

Further objects and advantages of my invention will become apparent from the following description referring to the accompanying drawing, and the features of novelty which characterize my invention will be pointed out with particularity in the claims annexed to and forming a part of this specification.

Figure 1:
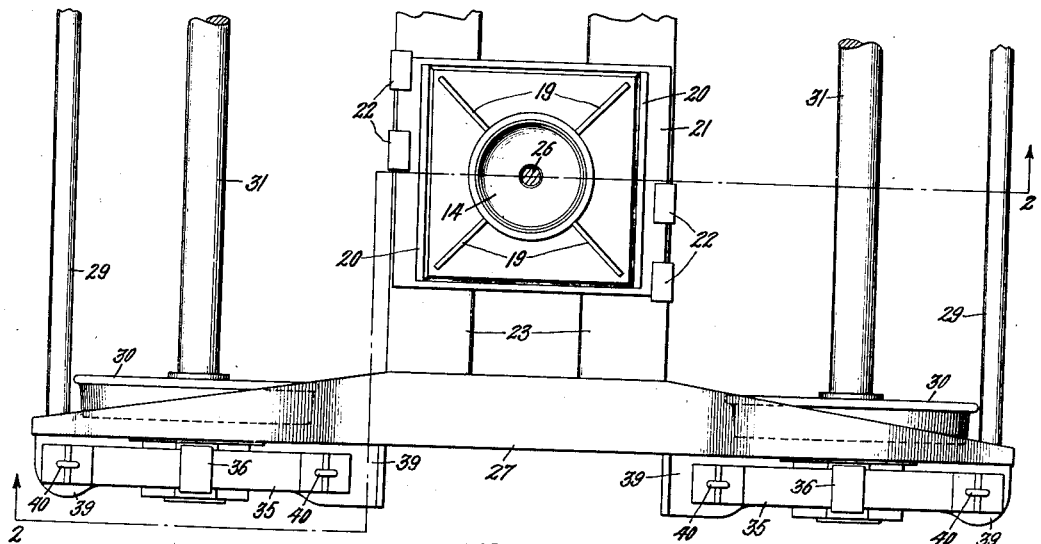
Figure 2:
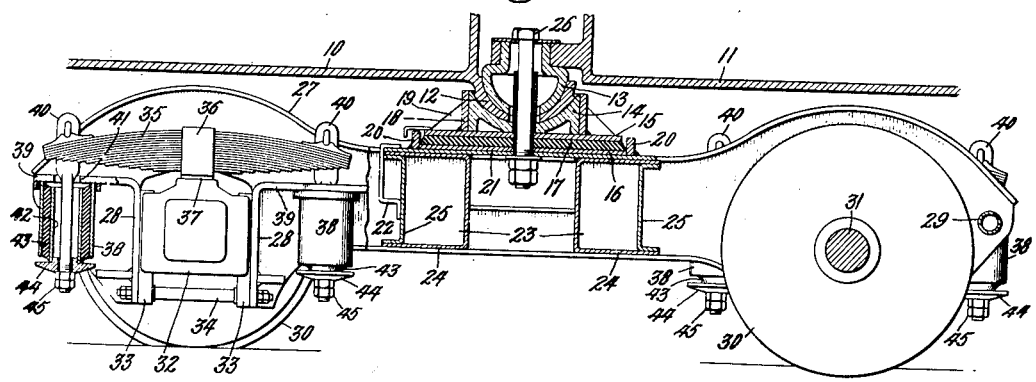

For a better understanding of my invention, reference is made to the accompanying drawing, wherein Fig. 1 is a plan view of part of a railway truck embodying my invention, and Fig. 2 is a side elevation in partial section taken along line 2—2 of Fig. 1.

Referring to the drawing, I have shown two articulated railway vehicle frames 10 and 11 having hemispherical bearings 12 and 13, respectively, supported by a truck center bearing 14. In order to minimize the transmission of the vibrations and noise from the truck to the vehicle frame, the center bearing 14 is supported on a composite center plate formed of two steel plates 15 and 16 between which is vulcanized a thin layer of resilient material 17 such as resilient rubber. The center bearing 14 is held in position on the upper center plate 15 in a cylindrical casing 18 welded to the upper plate 15 and is reenforced by gusset plates 19. The composite center plate is supported between laterally and longitudinally extending stops 20 on a truck center plate 21, which is rigidly secured to the truck bolster. Stops 20 will limit the horizontal movement of the upper plate 15 and prevent excessive flexure of the vulcanized resilient material 17. The truck bolster is formed of two laterally extending tubular sections 23, each of which is formed by two channel sections 24 and 25, which are welded together as shown in Fig. 2. A bolt 26 extends through openings formed in the bearings 12, 13 and 14, and openings formed in the center plates 15, 16, 17, and 21 so as to couple these together. The truck bolsters 23 are supported on side frames 27 which are provided with pedestals 28, and stay rods 29 are welded in openings formed in each end of the side frames 27 and connect the ends of the side frames on the two sides of the truck in order to provide a rigid truck frame. The truck frame is supported on wheels 30 which are mounted on a pair of axles 31, and each of the axles is provided with a journal box 32 arranged between the side frame pedestals 28 and have a vertically slidable engagement therewith through pedestal shoes 33 secured to the pedestals 28. In order to reenforce the pedestal construction, a tie bar 34 is bolted across the lower ends of the pedestals 28.

The truck frame is resiliently supported on the journal boxes 32 through longitudinally extending semi-elliptic leaf springs 35 each provided with a spring strap 36 extending about the central portion of the spring and supported on a spring seat 37 formed on the upper side of each of the journal boxes 32. Cylindrical vertically extending casings 38 are arranged on each side of the journal boxes 32 and are secured to upper flanges 39 formed on the pedestals 28. A resilient shock absorbing and noise dampening connection is provided between the truck frame and the journal boxes through swing links 40. These swing links are pivotally connected to each end of the springs 35 and extend through openings 41 formed in the flange 39 and through vertically extending sleeves 42 arranged coaxially with and secured in the casings 38 by cushions 43 of resilient material, such as rubber, vulcanized between the casings 38 and the sleeves 42. A thrust plate 44 is arranged about the lower ends of each of the cushioning assemblies and is retained in position by nuts 45 threaded on the swing links 40. In this manner the load on the truck is transmitted through the truck frame to the casings 38 and tends to compress and shear the cushions 43 between the thrust plates 44 and the sleeves 42, and shocks and jars of the wheels are effectively dampened by the springs 35 and the resilient cushions 43.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A truck for locomotives or cars having a frame, a journal box, a longitudinally extending spring supported on said journal box, a vertically extending casing secured to said frame on each side of said journal box, a vertically extending sleeve of different diameter than said casing arranged substantially coaxially and in overlapping relation therewith on each side of said journal box and pivotally connected to the ends of said spring, and means including a resilient rubbery member vulcanized between said casing and said sleeve for securing them together and arranged to transmit relative vertical forces therebetween by shear stress of said resilient rubbery member.

2. A truck for locomotives or cars, said truck having a frame, wheels and axles, a journal box for each of said axles, a spring seat formed on each of said journal boxes, a longitudinally extending leaf spring supported on each of said spring seats, a vertically extending casing secured to said frame on each side of each of said journal boxes, a vertically extending sleeve of different size than said casing arranged substantially coaxially and in telescopic relation therewith on each side of said journal boxes, means pivotally connecting said sleeve to the end of said spring, and means including a resilient rubbery cushioning member vulcanized between said casings and said sleeves for transmitting relative vertical forces therebetween by shear stress of said resilient member.

3. A truck for locomotives or cars, said truck having a frame, axles, a journal box for each of said axles, a spring seat formed on each of said journal boxes, a longitudinally extending leaf spring supported on each of said spring seats, a vertically extending member secured to said frame on each side of each of said journal boxes, a vertically extending second member of different diameter than said first mentioned member and arranged substantially coaxially and in telescopic relation therewith on each side of said journal boxes, a resilient rubbery cushioning member vulcanized between said first and second members for transmitting by shear stress of said resilient member relative vertical forces therebetween, and means for pivotally connecting said second member to the end of said spring.

4. A truck for locomotives or cars, said truck having a frame, axles, a journal box for each of said axles, a spring seat formed on each of said journal boxes, a longitudinally extending leaf spring supported on each of said spring seats, a vertically extending member secured to said frame on each side of each of said journal boxes, a vertically extending second member on each side of said journal box and arranged substantially coaxially and in overlapping relation with said first member, a resilient rubbery cushioning member vulcanized between said first and second members for transmitting by shear stress relative vertical forces therebetween, and means for pivotally connecting said second member to the end of said spring.

OLE K. KJOLSETH.